(12) United States Patent
Ying

(10) Patent No.: US 12,515,503 B1
(45) Date of Patent: Jan. 6, 2026

(54) ROLLER SHUTTER AND ROLLER SHUTTER COVER

(71) Applicant: Xiaoqian Ying, Zhejiang (CN)

(72) Inventor: Xiaoqian Ying, Zhejiang (CN)

( * ) Notice: Subject to any disclaimer, the term of this patent is extended or adjusted under 35 U.S.C. 154(b) by 0 days.

(21) Appl. No.: 18/885,669

(22) Filed: Sep. 15, 2024

(30) Foreign Application Priority Data

Aug. 22, 2024 (CN) .......................... 202411161360.X

(51) Int. Cl.
*B60J 7/04* (2006.01)
*B60J 7/057* (2006.01)
*E05F 15/662* (2015.01)

(52) U.S. Cl.
CPC ............. *B60J 7/041* (2013.01); *B60J 7/0573* (2013.01); *E05F 15/662* (2015.01); *E05Y 2201/628* (2013.01); *E05Y 2201/684* (2013.01); *E05Y 2201/706* (2013.01); *E05Y 2900/53* (2013.01)

(58) Field of Classification Search
CPC ..... E05F 15/662; E05F 15/605; E05F 15/611; E05Y 2900/53; E05Y 2201/628; E05Y 2201/706; B60J 7/041; B60J 7/0015; B60J 7/0573; B60J 10/90; B60J 7/02; E06B 9/0607; E06B 9/0638; E04F 10/10; E04F 10/08
See application file for complete search history.

(56) References Cited

U.S. PATENT DOCUMENTS

| | | | |
|---|---|---|---|
| 2013/0106133 A1* | 5/2013 | Maimin | B60J 7/1856 |
| | | | 296/100.09 |
| 2016/0031305 A1* | 2/2016 | Bernardo | B60J 7/085 |
| | | | 296/100.09 |
| 2018/0202210 A1* | 7/2018 | Letonje | E05D 15/24 |
| 2018/0313140 A1* | 11/2018 | Rejc | E06B 9/15 |
| 2019/0153774 A1* | 5/2019 | Balay | E06B 9/0676 |
| 2019/0263228 A1* | 8/2019 | Zeng | E06B 9/58 |
| 2020/0002984 A1* | 1/2020 | Svenson | E06B 9/0638 |
| 2020/0269666 A1* | 8/2020 | Xia | B60J 7/067 |
| 2021/0206246 A1* | 7/2021 | Fowler | B60J 7/0573 |
| 2021/0293515 A1* | 9/2021 | Mazej | E06B 9/15 |

* cited by examiner

*Primary Examiner* — Beth A Stephan
(74) *Attorney, Agent, or Firm* — Ying-Ting Chen

(57) ABSTRACT

Provided in the present disclosure are a roller shutter and a roller shutter cover with the same. The roller shutter includes a plurality of sequentially connected shutter slats, a bearing, and a rotating shaft, where the bearing is disposed on a side surface of the shutter slat and is rotatable about a central axis thereof, and two ends of the rotating shaft in an axial direction are connected to the shutter slat and the bearing respectively. According to the roller shutter and the roller shutter cover with the same above, the bearing is disposed on the roller shutter, and the movement of the shutter slat is driven by the motion of the bearing, thereby reducing the frictional resistance; meanwhile, the bearing has the better shock absorption and buffering performance, thereby reducing the noise caused by the movement of the shutter slat.

15 Claims, 6 Drawing Sheets

ROLLER SHUTTER AND ROLLER SHUTTER COVER

FIELD OF TECHNOLOGY

The present disclosure relates to the technical field of roller shutter covers, specifically to a roller shutter and a roller shutter cover.

BACKGROUND

The pickup truck is a light truck with an open-top truck bed. In order to improve sealing and convenience, some pickup trucks will be mounted with retractable roller shutter covers on top of truck beds.

However, the existing roller shutter cover has the following problems: there is a large friction between the roller shutter and the slide rail when the roller shutter is opened or folded for storage, making it easy to make noise and damage the roller shutter; and bumpiness of the vehicle in running will cause vibration of the roller shutter with poor shock absorption performance, resulting in short service life.

SUMMARY

In view of this, it is necessary to provide a roller shutter and a roller shutter cover, to solve at least one of the above problems.

In a first aspect, the present disclosure provides a roller shutter, applied to a roller shutter cover of a vehicle, and including:
  a plurality of sequentially connected shutter slats, where the shutter slats are movable under an external force so that the roller shutter switches between an opened state and a storage state;
  a bearing disposed on an end of the shutter slat and rotatable about a central axis thereof; and
  a rotating shaft, where two ends of the rotating shaft in an axial direction are connected to the shutter slat and the bearing respectively, so as to fix the bearing to the shutter slat.

Further, the bearing is a rolling bearing.

Further, each shutter slat is provided with two bearings, the two bearings are disposed at two opposite ends of the shutter slat in a length direction respectively, and central axes of the two bearings on the same shutter slat are collinear.

Further, the roller shutter further includes a bearing bracket disposed on one side of the bearing away from the shutter slat.

Further, an upper surface of the bearing bracket is flush with an upper surface of the shutter slat.

Further, a lower surface of the bearing bracket is parallel to a lower surface of the shutter slat.

Further, a protruding portion is disposed on one side of the bearing bracket close to the shutter slat, and a cavity is formed inside the shutter slat and has an opening towards the bearing bracket; and
  when the bearing bracket is mounted on the shutter slat, the protruding portion enters through the opening and is embedded into the cavity so that the bearing bracket is sleeved on the side surface of the shutter slat.

Further, each shutter slat is provided with two bearings and two bearing brackets, the two bearings are disposed at two opposite ends of the shutter slat in the length direction respectively, and positions of the bearing brackets are matched with positions of the bearings.

Further, two adjacent shutter slats are hinged to each other, an inverted hook and an arc-shaped rotating portion are disposed at two opposite sides of the shutter slat in a width direction respectively, the rotating portion of the shutter slat is sleeved on the inverted hook of the adjacent shutter slat, and the shutter slat is rotatable about the rotating portion thereof relative to the adjacent shutter slat.

Further, the inside of the rotating portion is of a hollow structure, a central axis of the rotating portion is collinear with the central axis of the bearing, and the rotating shaft passes through the rotating portion and the bearing.

Further, the inverted hook and the rotating portion extend from one end of the shutter slat in the length direction to the other end.

Further, the shutter slat has a front part, a middle part, and a rear part arranged in sequence along the width direction thereof, the rotating portion is connected to the front part, and the inverted hook is connected to the rear part; and
  the thickness of the rear part is greater than the thickness of the middle part, and the thickness of the middle part is greater than the thickness of the front part.

Further, the thickness of the front part increases along a width direction thereof from one side away from the middle part to one side close to the middle part, and the thickness of the rear part increases along a width direction thereof from the side close to the middle part to the side away from the middle part.

Further, an avoidance space for the inverted hook to rotate is formed between the front part and the rotating portion.

In a second aspect, the present disclosure provides a roller shutter cover, including:
  a slide rail;
  the roller shutter as described in the first aspect, where at least part of the bearing is disposed on the slide rail, and the bearing is movable on the slide rail.

Further, a track groove for carrying the bearing is formed on the slide rail, and a length extension direction of the track groove is parallel to a length extension direction of the slide rail.

Further, there are two slide rails disposed on two opposite ends of the shutter slat in a length direction respectively.

Further, the roller shutter cover further includes a driving device connected to one end of the roller shutter.

Further, the driving device is a driving motor capable of rotating forward or backward to drive the roller shutter to switch between an opened state and a storage state.

Further, a transmission shaft is disposed at one end of the roller shutter, a transmission bracket is disposed on the driving motor, the transmission shaft is connected to the transmission bracket, and the driving motor drives the transmission shaft to move by the transmission bracket, so as to drive the roller shutter.

It can be seen from the above technical solution that the embodiment of the present disclosure has at least the following advantages and positive effects:

According to the roller shutter and the roller shutter cover with the same above, as the bearing is disposed on the roller shutter, contact between the shutter slat and a slide rail is changed to contact between the bearing and the slide rail; the movement of the shutter slat is driven by the motion of the bearing, thereby reducing the frictional resistance; meanwhile, the bearing has the better shock absorption and buffering performance, thereby reducing the noise caused by the movement of the shutter slat.

BRIEF DESCRIPTION OF THE DRAWINGS

In order to more clearly illustrate the technical solutions in the embodiments of the present disclosure or in the prior art, the accompanying drawings that need to be used in the description of the embodiments or the prior art will be briefly introduced below. Apparently, the accompanying drawings in the description below merely illustrate some embodiments of the present disclosure. Those of ordinary skill in the art may also derive other accompanying drawings from these accompanying drawings without creative efforts. In the drawings.

DESCRIPTION OF REFERENCE SIGNS 10. roller shutter cover;
100. roller shutter; 110. shutter slat; 111. cavity; 112. inverted hook; 113. rotating portion; 114. front part; 115. middle part; 116. rear part; 117. avoidance space; 120. bearing; 130. rotating shaft; 140. bearing bracket; 141. protruding portion; 150. transmission shaft;
200. slide rail; 210. track groove;
300. driving device; 310. driving motor; and 320. transmission bracket.

DESCRIPTION OF THE EMBODIMENTS

Typical embodiments that embody the features and advantages of the present disclosure will be described in detail in the following description. It should be understood that the present disclosure can have various changes in different embodiments without departing from the scope of the present disclosure, and the description and drawings therein are essentially for illustrative purposes and not intended to limit the present disclosure.

In addition, the terms "first" and "second" are only for descriptive purposes, and cannot be construed as indicating or implying relative importance or implying the number of technical features indicated. Thus, the features defined with "first" and "second" may explicitly or implicitly include one or more of the features. In the description of the present disclosure, "a plurality of" means two or more, unless otherwise expressly and specifically defined. In addition, "/" means "or", for example, A/B may represent A or B; and "and/or" herein is merely an association relationship describing associated objects, indicating that three kinds of relationships may exist, for example, A and/or B may indicate three cases in which A exists alone, both A and B exist, and B exists alone.

The terms "dispose", "connected", and "connect" should be understood in a broad sense, unless otherwise expressly specified and limited. For example, it may be a fixed connection, a detachable connection, or an integrated connection; it may be a mechanical connection or an electrical connection; and it may be being directly connected, being indirectly connected via an intermediate medium, or a communication between interiors of two elements.

In the existing roller shutter cover of a pickup truck, there is a large friction between the roller shutter and the slide rail, making it easy to make noise and damage the roller shutter; and bumpiness of the vehicle in running will cause vibration of the roller shutter with poor shock absorption performance, resulting in short service life.

In order to solve at least one of the above technical problems, the present disclosure provides a roller shutter 100 and a roller shutter cover 10 with the roller shutter.

Figure 1:
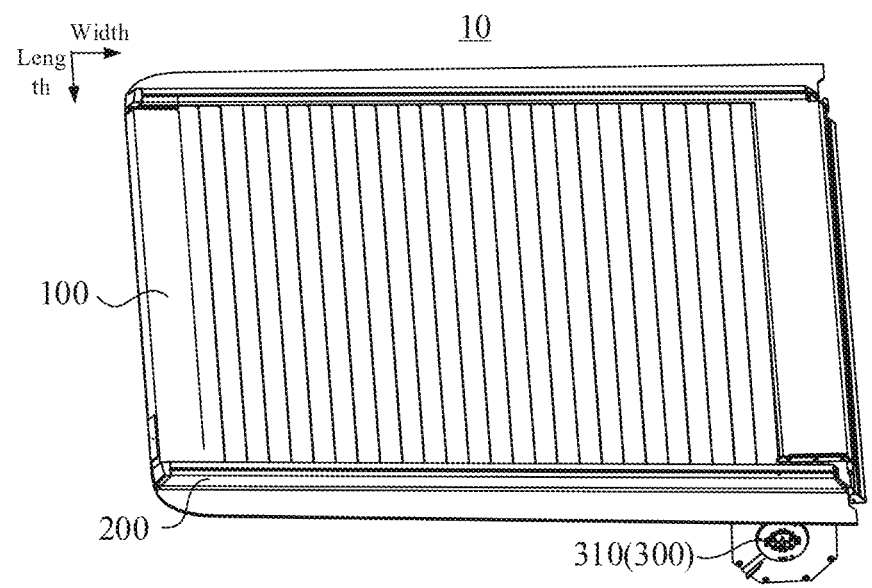
FIG. 1 is a schematic structural diagram of a roller shutter and a roller shutter cover in an opened state in an embodiment of the present disclosure.
Figure 2:
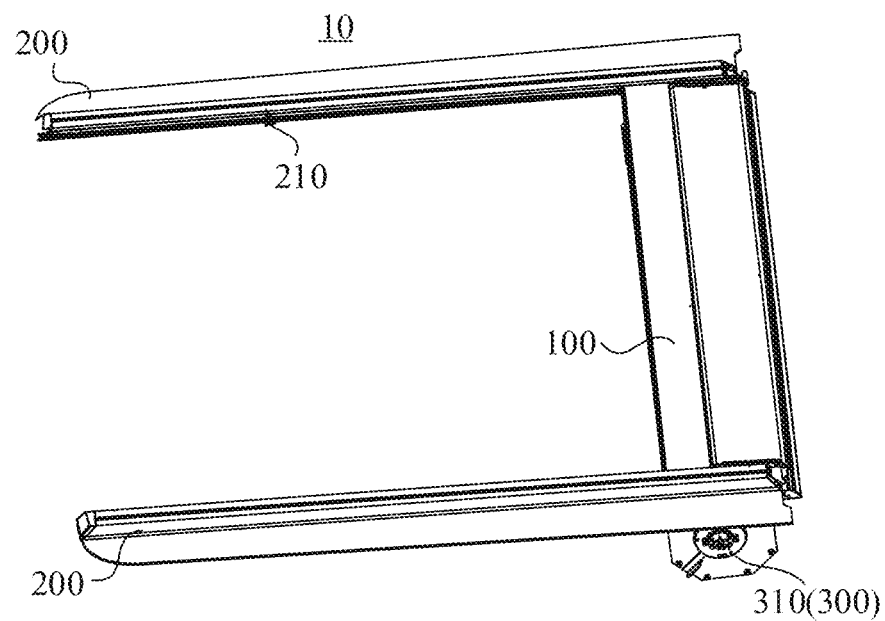
FIG. 2 is a schematic structural diagram of the roller shutter and the roller shutter cover in a storage state that are shown in FIG. 1.
Figure 3:
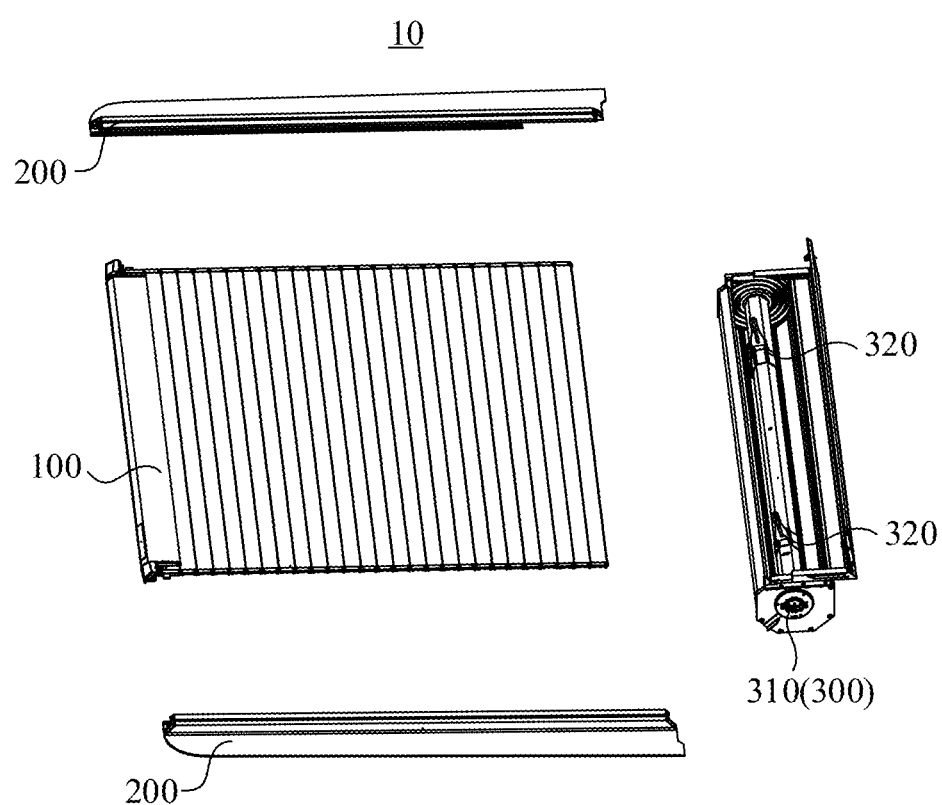
FIG. 3 is an exploded structural view of the roller shutter cover shown in FIG. 1.

Referring to FIG. 1, FIG. 2, and FIG. 3, the roller shutter cover 10 is configured to cover a truck bed of a pickup truck, and the roller shutter 100 has an opened state shown in FIG. 1 and a storage state shown in FIG. 2. When the roller shutter 100 is in the opened state, the roller shutter cover 10 can protect goods in the truck bed from wind and rain. When the roller shutter 100 is in the storage state, a user can carry the goods to the truck bed. It can be understood that the roller shutter 100 can be configured to cover the truck bed of the pickup truck, and the roller shutter 100 can also be configured to cover carrier vehicles such as cars and heavy-duty trucks. In addition, the roller shutter 100 can also be used for a non-transportation means such as a roller shutter 100 door.

The roller shutter cover 10 further includes a slide rail 200, where one end of the roller shutter 100 in a length direction is connected to the slide rail 200, and the roller shutter 100 is movable on the slide rail 200.

It is to be noted that the "length direction" and the "width direction" appearing throughout the present disclosure are as shown in FIG. 1, the "length direction" refers to a direction perpendicular to a moving direction of the roller shutter 100, the "width direction" refers to a direction parallel to the moving direction of the roller shutter 100, and the "length direction" and the "width direction" have nothing to do with specific numerical values.

Figure 4:
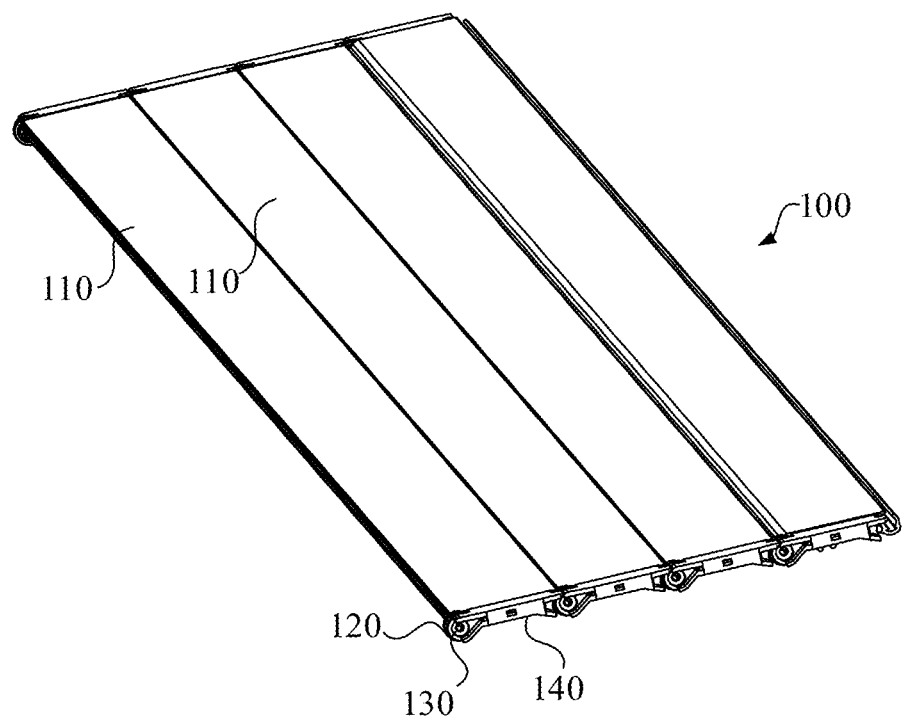
FIG. 4 is a schematic diagram of a roller shutter with a partial structure omitted that is shown in FIG. 3.

Referring to FIG. 4, the roller shutter 100 includes a plurality of sequentially connected shutter slats 110, a bearing 120, and a rotating shaft 130, where the bearing 120 is disposed on an end of the shutter slat 110 and is rotatable about a central axis thereof, the rotating shaft 130 passes through the shutter slat 110 and the bearing 120 to fix the bearing 120 to the shutter slat 110, at least part of the bearing 120 is disposed on a slide rail 200, the bearing 120 is movable on the slide rail 200, and the shutter slat 110 is movable under an external force and the bearing 120 moves on the slide rail 200 so that the roller shutter 100 switches between an opened state and a storage state. It can be understood that the rotating shaft 130 may also be integrally formed with the shutter slat 110, in which case the rotating shaft 130 serves as a part of the shutter slat 110.

In the present disclosure, as the bearing 120 is disposed on the roller shutter 100, contact between the shutter slat 110 and the slide rail 200 is changed to contact between the bearing 120 and the slide rail 200; the movement of the shutter slat 110 is driven by the motion of the bearing 120, thereby reducing the frictional resistance; meanwhile, the bearing 120 has the better shock absorption and buffering performance, thereby reducing the noise caused by the movement of the shutter slat 110.

Figure 5:
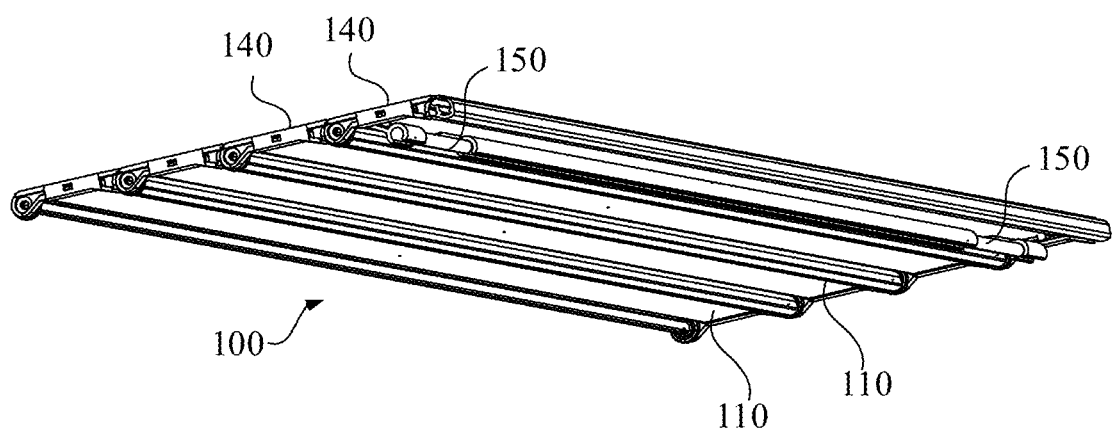
FIG. 5 is a schematic structural diagram of the roller shutter shown in FIG. 4 from another perspective.

In this embodiment, referring to FIG. 4 and FIG. 5, each shutter slat 110 is correspondingly provided with two bearings 120, the two bearings 120 are disposed at two opposite ends of the shutter slat 110 in a length direction respectively, and central axes of the two bearings 120 on the same shutter slat 110 are collinear. In this way, forces and motion velocities at two ends of the shutter slat 110 in the length direction during motion remain basically consistent, parts at two ends of the shutter slat 110 in the length direction will not collide with the slide rail 200, and the shutter slat 110 will not move to increase the frictional resistance. Certainly, the manufacturer can also only arrange one bearing 120 as needed, which is not limited in the present disclosure.

The roller shutter 100 further includes a bearing bracket 140, where the bearing bracket 140 is disposed on one side of the bearing 120 away from the shutter slat 110. The bearing bracket 140 is capable of fixing the bearing 120 to prevent movement of the bearing 120. In addition, the bearing bracket 140 can also provide support for the shutter slat 110 to prevent excessive deformation of an edge of the shutter slat 110.

Specifically, an upper surface of the bearing bracket 140 is flush with an upper surface of the shutter slat 110, thereby preventing the bearing bracket 140 from affecting folding storage of the shutter slat 110, and preventing the bearing bracket 140 from protruding out of the shutter slat 110 to collide with a hand. In addition, a lower surface of the bearing bracket 140 is parallel to a lower surface of the shutter slat 110, thereby avoiding an influence on folding storage of the shutter slat 110.

Figure 7:
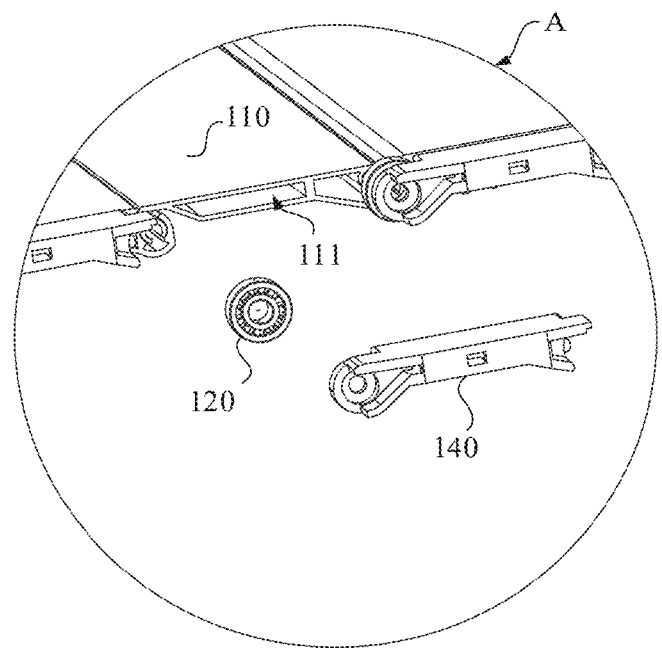
FIG. 7 is a partial enlarged view of an area A shown in FIG. 6.
Figure 10:
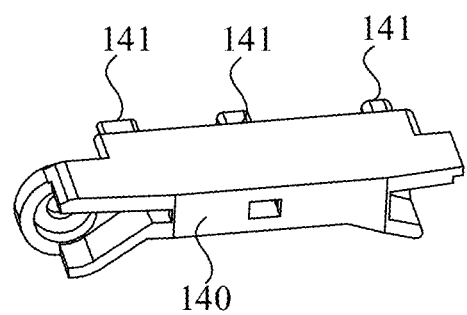
FIG. 10 is an overall structure diagram of a bearing bracket shown in FIG. 6.

Further, referring to FIG. 7 and FIG. 10 in combination, a protruding portion 141 is disposed on one side of the bearing bracket 140 close to the shutter slat 110, a cavity 111 is formed inside the shutter slat 110, and the cavity 111 has an opening towards the bearing bracket 140; and when the bearing bracket 140 is mounted on the shutter slat 110, the protruding portion 141 enters through the opening and is embedded into the cavity 111 so that the bearing bracket 140 is sleeved on the end of the shutter slat 110. In this way, the bearing 120 can be stably mounted on the side surface of the shutter slat 110 without an additional fixing part.

In this embodiment, each shutter slat 110 is provided with two bearings 120 and two bearing brackets 140, the two bearing brackets 140 are disposed at two opposite ends of the shutter slat 110 in the length direction respectively, and positions of the bearing brackets 140 are matched with positions of the bearings 120, that is, when one bearing 120 is disposed each time, one bearing bracket 140 is disposed on one side of the bearing 120 away from the shutter slat 110. In this way, the motion of the bearing 120 and the shutter slat 110 can be more stable, and the vibration of the shutter slat 110 can be reduced.

Figure 6:
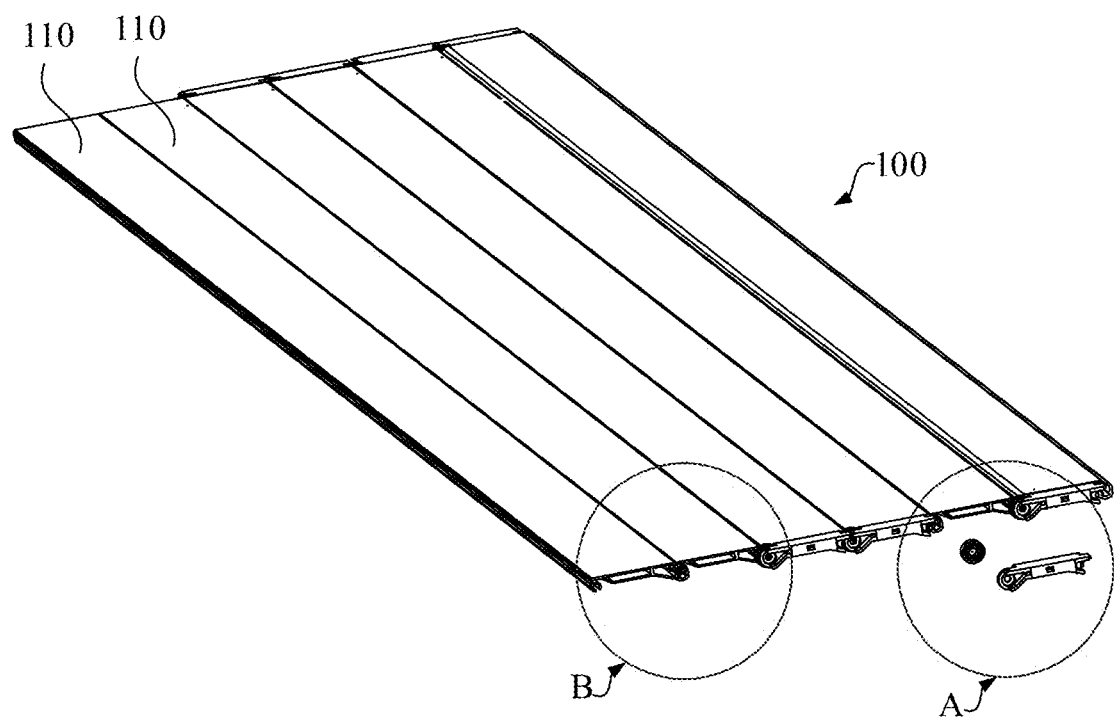
FIG. 6 is a schematic diagram of the roller shutter with a partial structure omitted that is shown in FIG. 4.
Figure 8:
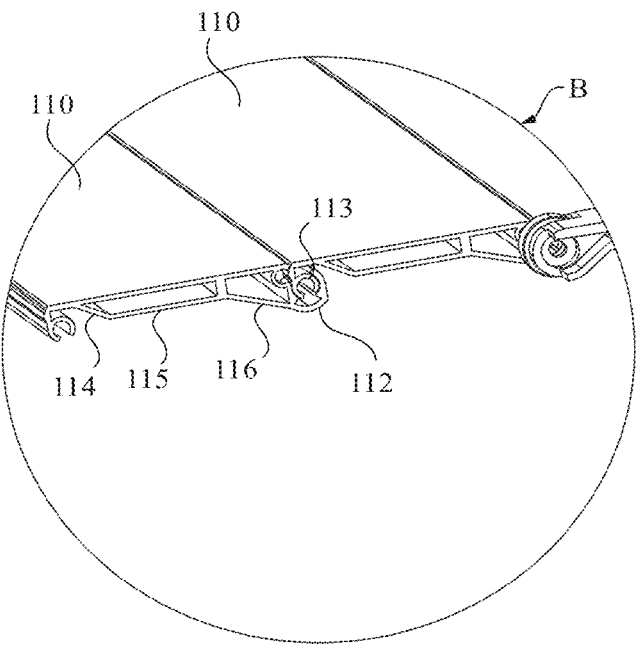
FIG. 8 is a partial enlarged view of an area B shown in FIG. 6.
Figure 9:
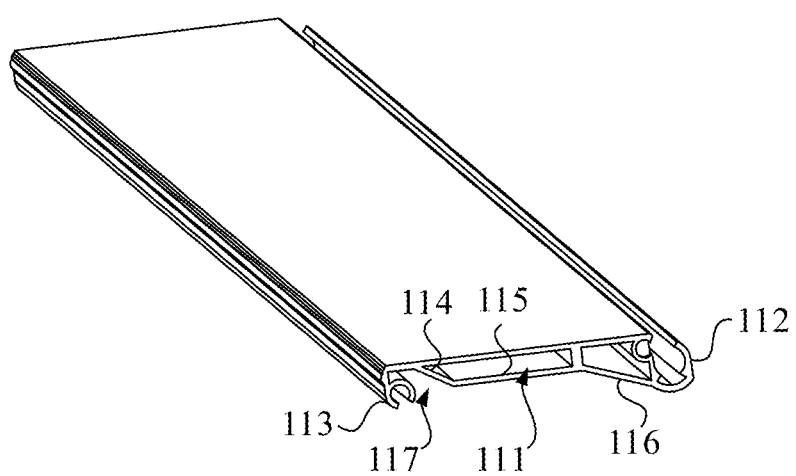
FIG. 9 is an overall structure diagram of a shutter slat shown in FIG. 6.

Specifically, referring to FIG. 6, FIG. 8, and FIG. 9 in combination, two adjacent shutter slats 110 are hinged to each other, an inverted hook 112 and a rotating portion 113 are disposed at two opposite ends of the shutter slat 110 in a width direction respectively, the rotating portion 113 of the shutter slat 110 is sleeved on the inverted hook 112 of the adjacent shutter slat 110, and the shutter slat 110 is rotatable about the rotating portion 113 thereof relative to the adjacent shutter slat 110. The two adjacent shutter slats 110 are rotatable for each other, thereby facilitating folding storage of the shutter slats 110; and the shutter slats 110 can cling to each other after folding storage, making it smaller for space occupied by the roller shutter 100.

Further, referring to FIG. 5, FIG. 6, and FIG. 7 in combination, the inside of the rotating portion 113 is of a hollow structure, a central axis of the rotating portion 113 is collinear with the central axis of the bearing 120, and the rotating shaft 130 passes through the rotating portion 113 and the bearing 120. In this way, the relative rotation of a shutter slat 110 bracket and the motion of the bearing 120 can be smoother, and the motion of the roller shutter 100 can be more stable, thereby reducing vibration of the roller shutter 100 during the motion.

Further, referring to FIG. 5 and FIG. 8 in combination, the inverted hook 112 extends from one end of the roller shutter 100 in the length direction to the other end, and the rotating portion 113 extends from one end of the shutter slat 110 in the length direction to the other end. In this way, the mutual rotation of the adjacent shutter slats 110 and the motion of the roller shutter 100 are more stable. In addition, the inverted hook 112 and the rotating portion 113 can also serve to support the shutter slat 110, thereby avoiding excessive deformation of the shutter slat 110 as a whole, and reducing shaking of the shutter slat 110 during motion.

Specifically, referring to FIG. 7, the bearing 120 is a rolling bearing 120, the rolling bearing 120 internally includes a plurality of rolling elements arranged in a circumferential direction, and the rolling bearing 120 is capable of rolling on the slide rail 200 to further reduce the frictional resistance. It can be understood that the manufacturer can also use a sliding bearing 120 to replace the rolling bearing 120 as needed. The sliding bearing 120 is not as good as the rolling bearing 120 in reducing the frictional resistance, but the sliding bearing 120 has stronger carrying capacity.

In this embodiment, referring to FIG. 8 and FIG. 9, the shutter slat 110 has a front part 114, a middle part 115, and a rear part 116 arranged in sequence along the width direction thereof, where the rotating portion 113 is connected to the front part 114, the inverted hook 112 is connected to the rear part 116, the thickness of the rear part 116 is greater than the thickness of the middle part 115, and the thickness of the middle part 115 is greater than the thickness of the front part 114. It can be understood that during storage of the roller shutter 100, the two adjacent shutter slats 110 will be overlapped and folded, and the shutter slat 110 and the adjacent shutter slat 110 are in contact with the rotating portion 113, the front part 114, the middle part 115, the rear part 116, and the inverted hook 112 in sequence. Accordingly, it is set that the thickness of the front part 114<the thickness of the middle part 115<the thickness of the rear part 116, and the thickness roughly tends to increase, such that the overlapping and folding of the adjacent shutter slats 110 are smoother, thereby reducing vibration and noise.

Specifically, the thickness of the front part 114 increases along a width direction thereof from one side away from the middle part 115 to one side close to the middle part 115, and the thickness of the rear part 116 increases along a width direction thereof from the side close to the middle part 115 to the side away from the middle part 115. In this way, the overlapping and folding resistance of the adjacent shutter slats 110 can be reduced. Further, an avoidance space 117 is formed between the front part 114 and the rotating portion 113. The avoidance space 117 is used for the inverted hook 112 to rotate.

Specifically, continuously referring to FIG. 2, a track groove 210 for carrying the bearing 120 is formed on the slide rail 200, and a length extension direction of the track groove 210 is parallel to a length extension direction of the slide rail 200. The track groove 210 is formed, such that the bearing 120 can be prevented from moving or separating from the slide rail 200 during movement of the roller shutter 100, and the bearing 120 is capable of moving more smoothly.

Further, there are two slide rails 200, where the two slide rails 200 are disposed on two opposite ends of the shutter slat 110 in the length direction respectively. The slide rails 200 are disposed at the two ends of the shutter slat, such that forces and motions at the two ends of the shutter slat 110 in the length direction can be basically consistent, making it smoother and more stable for motion of the roller shutter 100.

In this embodiment, the roller shutter cover 10 further includes a driving device 300, where one end of the roller shutter 100 is connected to the driving device 300, and the driving device 300 is configured to drive the roller shutter 100 to switch between the opened state and the storage state. It can be understood that in other embodiments, the roller shutter cover 10 may not be provided with the driving device 300, and the motion of the roller shutter 100 is manually driven. Alternatively, the roller shutter cover 10 is provided with the driving device 300, but the roller shutter cover 10 has two driving modes of manual driving and driving device 300 based driving.

Specifically, the driving device 300 is a driving motor 310, where the driving motor 310 is capable of rotating forward or backward to drive the roller shutter 100 to switch between the opened state and the storage state. It can be understood that in other embodiments, the driving device 300 may also be a cylinder, a magnetic pole driver, etc.

In this embodiment, referring to FIG. 3 and FIG. 5 in combination, a transmission shaft 150 is disposed at one end of the roller shutter 100, a transmission bracket 320 is disposed on the driving motor 310, the transmission shaft 150 is connected to the transmission bracket 320, and the driving motor 310 drives the transmission shaft 150 to move by the transmission bracket 320, so as to drive the roller shutter 100. Specifically, there are two transmission shafts 150 and two transmission brackets 320, where the transmission shafts 150 are disposed on two opposite ends of the shutter slat 110 in the length direction, and positions of the transmission brackets 320 are matched with positions of the transmission shafts.

What is claimed is:

1. A roller shutter for use with a roller shutter cover of a vehicle, the roller shutter comprising:
   a plurality of shutter slats connected in sequence, wherein the plurality of shutter slats have opposite ends and are movable under an external force so that the roller shutter switches between an opened state and a storage state;
   a bearing disposed on one of the ends of each of the shutter slats and rotatable about a central axis thereof; and
   a plurality of rotating shafts, wherein ends of the rotating shafts in an axial direction are connected to the shutter slats and the bearings respectively, so as to fix the bearings to the shutter slats;
   wherein two adjacent shutter slats of the plurality of the shutter slats are hinged to each other, an inverted hook and an arc-shaped rotating portion are disposed at two opposite sides of the shutter slat in a width direction respectively, the rotating portion of one of the adjacent shutter slats is sleeved on the inverted hook of the other of the adjacent shutter slats, and the one shutter slat is rotatable about the rotating portion thereof relative to the adjacent shutter slat: an inside of the rotating portion is of a hollow structure, a central axis of the rotating portion is collinear with the central axis of the bearing, and the rotating shaft passes through the rotating portion and the bearing.

2. The roller shutter according to claim 1, wherein the bearing is a rolling bearing.

3. The roller shutter according to claim 1, wherein the bearing disposed on one of the ends of each of the shutter slats comprises two bearings, one of the two bearings is disposed at each of the ends of each of the shutter slats in a length direction respectively, and central axes of the two bearings on the same shutter slat are collinear.

4. The roller shutter according to claim 1, further comprising a bearing bracket disposed on one side of the bearing away from the shutter slat.

5. The roller shutter according to claim 4, wherein an upper surface of the bearing bracket is flush with an upper surface of the shutter slat.

6. The roller shutter according to claim 4, wherein a lower surface of the bearing bracket is parallel to a lower surface of the shutter slat.

7. The roller shutter according to claim 4, wherein a protruding portion is disposed on one side of the bearing bracket close to the shutter slat, and a cavity is formed inside the shutter slat and has an opening towards the bearing bracket; and when the bearing bracket is mounted on the shutter slat, the protruding portion enters through the opening and is embedded into the cavity so that the bearing bracket is sleeved on one of the ends of the shutter slat.

8. The roller shutter according to claim 7, wherein the bearing disposed on one of the ends of each of the shutter slats comprises two bearings and the bearing bracket comprises two bearing brackets, one of the two bearings is disposed at each of the ends of each of the shutter slats in a length direction respectively, and positions of the two bearing brackets are matched with positions of the two bearings.

9. The roller shutter according to claim 1, wherein the inverted hook and the rotating portion extend from one of the ends of the shutter slat in a length direction to the other end.

10. The roller shutter according to claim 1, wherein each of the shutter slats has a front part, a middle part, and a rear part arranged in sequence along the width direction thereof, the rotating portion is connected to the front part, and the inverted hook is connected to the rear part; and
    a thickness of the rear part is greater than a thickness of the middle part, and the thickness of the middle part is greater than a thickness of the front part.

11. The roller shutter according to claim 10, wherein the thickness of the front part increases along a width direction thereof from one side away from the middle part to one side close to the middle part, and the thickness of the rear part increases along a width direction thereof from a side close to the middle part to a side away from the middle part.

12. The roller shutter according to claim 11, wherein an avoidance space for the inverted hook to rotate is formed between the front part and the rotating portion.

13. A roller shutter cover, comprising:
    a slide rail;
    the roller shutter according to claim 1, wherein at least part of the bearings are disposed on the slide rail, and movable on the slide rail;
    a driving device connected to one end of the roller shutter, wherein the driving device is a driving motor capable of rotating forward or backward to drive the roller shutter to switch between the opened state and the storage state; and a transmission shaft is disposed at the one end of the roller shutter, a transmission bracket is disposed on the driving motor, the transmission shaft is connected to the transmission bracket, and the driving motor drives the transmission shaft to move by the transmission bracket, so as to drive the roller shutter.

14. The roller shutter cover according to claim 13, wherein a track groove for carrying the bearing is formed on the slide rail, and a length extension direction of the track groove is parallel to a length extension direction of the slide rail.

15. The roller shutter cover according to claim 13, wherein there are two slide rails disposed on the opposite side surfaces of the shutter slat in a length direction respectively.

\* \* \* \* \*